J. W. JEPSON.
SYSTEM OF ELECTRICAL DISTRIBUTION
APPLICATION FILED APR. 17, 1906.
1,296,292.
Patented Mar. 4, 1919.
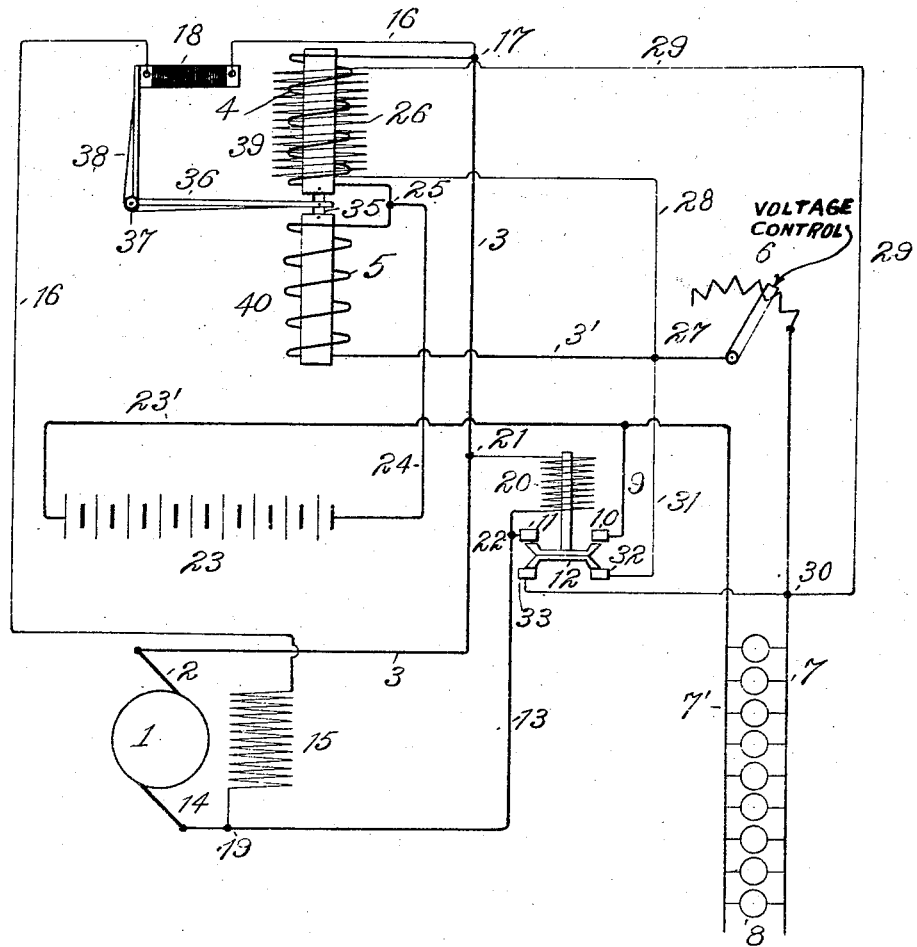

UNITED STATES PATENT OFFICE.

JOHN W. JEPSON, OF NEW YORK, N. Y.

SYSTEM OF ELECTRICAL DISTRIBUTION.

1,296,292.  Specification of Letters Patent.  Patented Mar. 4, 1919.

Application filed April 17, 1906. Serial No. 312,223.

*To all whom it may concern:*

Be it known that I, JOHN W. JEPSON, citizen of the United States, residing in the city, county, and State of New York, have invented new and useful Improvements in Systems of Electrical Distribution; and in order that those skilled in the art may understand and practice my invention I give the following specification.

My invention relates to systems of electrical distribution in which automatically operating devices are employed for regulating the generator voltage and in which means are provided for regulating the consumption circuit current to the requirements of the system and is particularly adapted to systems in which the generator is subject to variations in its driving speed, such for instance as in systems of car lighting where the power is derived from the car axle.

The object of my invention is to provide a system of electrical distribution in which the regulation is obtained by means of a simple and economical construction and arrangement of parts whereby the generator voltage is automatically regulated irrespective of generator speed to supply a practically constant voltage to the translating devices, and to charge a storage battery in a manner best suited to the operation and life thereof.

A further object of the invention is to provide automatically operating devices to enable the battery to carry the load at times when the generator is not working or its voltage insufficient for the translating devices, to connect the generator with the consumption circuit in parallel with the battery when its voltage is sufficient for the translating devices and to enable the battery to receive a charge and its charging rate to be automatically regulated upon increase of generator voltage above that required for the translating devices.

In the accompanying drawing, I have illustrated diagrammatically a system of electrical distribution embodying my invention.

Referring to the drawing: 1 represents the generator, the circuit of which is from the positive brush 2, conductor 3, through series coils 4 to point 25, at which it joins the consumption circuit. The consumption circuit is from the point 25, series coil 5, conductor 3', adjustable resistance 6 to the circuit 7—7' of the translating devices 8. The circuit 7—7' is connected to the negative side of the generator through branch 9, contacts 10 and 11 of a circuit closer 12, conductor 13 to brush 14 of the generator. The field circuit of the generator is from a point 17 in conductor 3, through conductor 16 and field coil 15 to point 19. This field circuit has included therein, a variable resistance indicated at 18. This resistance is shown as of the pressure contact type consisting of carbon plates in loose contact one with the other, commonly termed a carbon pile the resistance of which is varied by variations in pressure applied to the plates.

A storage battery 23, is connected to the consumption circuit at the point 25 by a conductor 24, the other side of the battery being connected to the other side of the consumption circuit by a branch 23'.

Circuit closer 12 operates to connect or disconnect the generator to the consumption circuit and its operation is effected by means of a coil 20 connected across the generator at the points 21 and 22. The circuit closer is thus dependent upon the voltage of the generator. Circuit closer 12 also controls the circuit leading from contact 32 through conductor 31 to point 27 in the consumption circuit, conductor 28, coil 26, conductor 29, point 30 to the other contact 33. In the position shown in the drawing with the circuit closer 12 closing the contacts 32 and 33, coil 26 is short circuited, and the generator is disconnected from the consumption circuit. The closer 12 also shunts the variable resistance translation circuit regulator 6, so that the battery current does not have to flow through the regulator 6 and the voltage drop across the regulator 6 is decreased when the battery supplies the translating devices 8.

The resistance 18 in the generator field circuit is controlled by means of solenoids 39 and 40. Solenoid 39 is energized by the coil 4 in the generator circuit, and solenoid 40 is energized by the coil 5 in the consumption circuit. These two solenoids act oppositely upon the arm 36 of a bell-crank lever pivoted at 37, the other arm of which presses upon the carbon plates of the variable resistance 18. To obtain this, the electro-magnetic cores of the two solenoids are connected by a link 35, to which is also connected the arm 36 of the bell-crank lever, whereby the coils coöperate in the regulation of the generator and the current responsive coils, which by their combined effect measure the current going to the battery, weaken or affect the action of the voltage coil 26. Coil 26 is also wound upon the core of solenoid 39.

The operation of the system is as follows:
The generator being disconnected as shown in the drawing, its voltage being below that required for the translating devices or lights 8 by reason of its speed being too low, or by reason of the car or other vehicle to which the system is applied being stationary, the battery supplies the translating devices, being directly connected therewith. Upon increase of generator speed and consequent rise of generator voltage to a predetermined value equal to that required for the translating devices, coil 20 of circuit closer or relay switch 12 becomes energized sufficiently to operate said circuit closer, thereby closing contacts 10 and 11 and opening contacts 32 and 33, whereby an effective current may flow in coil 26. The generator is now connected to the consumption circuit and coil 4 in the generator circuit becomes energized.

When the current circulating through this coil causes its magnetic effect to be equal to that of coil 5, the generator will supply the full amount of energy required for the translating devices. Under these conditions, the battery will cease to discharge and will float. Upon further increase of generator speed, when more than the desired current tends to go to the battery, the magnetic effect of coil 4, which is serially connected between the generator and battery, will increase and over-balance the effect of coil 5 and the weight of the solenoid cores, thus causing the arm 36 to be raised and cutting more resistance into the generator field, and preventing any further increase of generator current. Under these circumstances, the battery will receive a charge, this charge being regulated and controlled by the action of coil 26 upon solenoid 39.

Upon closing the generator circuit at the contacts 10 and 11, the short circuit of coil 26 through contacts 32 and 33 was opened and coil 26 thereupon was in shunt around the resistance 6. Resistance 6, in the consumption circuit, is regulated either by hand or preferably by automatic means (not shown) to maintain a constant potential upon the translating devices in order to maintain a substantially constant current therein, irrespective of the potential supplied to the consumption circuit. Coil 26 being in shunt to this resistance when the battery potential rises during charge, coil 26 becomes energized and adds its effect to coil 4, cutting more resistance into the generator field circuit, thereby preventing rise of generator voltage beyond that sufficient to give the battery a charge, and also as the battery voltage rises, tends to reduce the generator voltage so that the battery is charged in a manner consistent with its proper operation and requirements and best suited to its maintenance and efficiency.

Modifications of the various devices illustrated and described may be made within the scope of my invention without departing from the spirit and scope thereof.

Having described my invention and the manner of its operation, what I claim is:

1. The combination with a storage battery, a generator and regulating means therefor, of means for affecting the regulating means in response to voltage fluctuations, and means for affecting the regulating means in response to current fluctuations, said affecting means including means whereby the affecting means coöperate in the regulation of the generator.

2. The combination with a generator, a translation circuit and a regulator for the translation circuit, of means for regulating the generator current and means for regulating the generator voltage, said voltage regulating means being operated in response to an effect produced by the translation circuit regulating means.

3. In a system of electrical distribution of the type including a variable speed generator which charges a storage battery and simultaneously supplies current to a work circuit, the generator being controlled automatically by a regulator which varies the generator field strength to maintain substantial constancy of voltage as against speed changes, means adapted to control said regulator to maintain a constant battery charging current, a coil adapted when effectively energized to act upon said regulator cumulatively with said means, and means acting as the battery becomes charged to render said coil effective in the control of the regulator.

4. In a system of electrical distribution of the type wherein a variable speed generator charges a storage battery and maintains substantial constancy of generator voltage as against speed changes by a regulator including a current coil traversed by the charging current and acting through suitable means to vary the field magnet strength of the generator, the combination with said current coil of a second coil arranged to act cumulatively with the current coil, a variable resistance connected with said second coil, and means for gradually varying the resistance as the battery becomes charged to gradually increase the pull exerted by said second coil.

5. In a system of electrical distribution of the type wherein a variable speed generator charges a storage battery and maintains substantial constancy of generator voltage as against speed changes by a regulator including a current coil traversed by the charging current acting through suitable means to control the field magnet strength of the generator, the combination with said current coil of a second coil arranged to act cumulatively with the current coil, a variable resistance connected with said second coil, and voltage responsive means controlling said resistance to gradually increase the power of said second coil as the battery becomes more and more charged.

6. In a system of electrical distribution, the combination with a generator, generator circuit, a storage battery and consumption circuit, of a loose contact resistance device in the generator field circuit, two solenoids each provided with a core acting in opposite senses upon said resistance device, one of said solenoids in series in the generator circuit and acting to increase resistance in the generator field circuit, the other of said solenoids in series with battery discharge to decrease resistance in the generator field circuit.

7. In a system of electrical distribution, the combination of a generator circuit, storage battery and a consumption circuit, of a voltage regulator for the generator, two solenoids each having its core acting oppositely upon said regulator, a winding for one of said solenoids in series in the generator circuit tending to decrease generator voltage, a winding in the consumption circuit for the other solenoid tending to increase generator voltage and a winding for the first solenoid tending to decrease generator voltage, said latter winding responsive to rise of battery voltage during charge.

8. In a system of electrical distribution the combination with a consumption circuit, a storage battery and a generator for supplying said circuit, of a voltage regulator for the generator, means to adjust the voltage in the consumption circuit, and means operated by the potential difference between the supply and the consumption circuit to operate the voltage regulator.

9. In an electrical system of distribution, the combination of a generator driven at a variable speed, a work circuit fed thereby, a storage battery in operative relation therewith, a resistance between said battery and work circuit, means for regulating the generator voltage, a coil responsive to current fluctuations and a coil responsive to variations in voltage across said resistance, both of said coils operating upon said means.

10. In a car lighting apparatus, in combination, a shunt wound generator, a storage-battery connected to be charged thereby, a variable resistance medium comprising a plurality of contacting members adapted to vary their aggregate resistance with the pressure thereon, said resistance medium being connected with the field circuit of said generator, a member through which pressure is exerted upon said medium, a pivoted bell-crank lever one arm of which is connected with said member, magnetic actuating means connected with the other arm of said lever, means comprising a coil serially connected between said generator and said battery adapted upon the current therein increasing to attract said actuating means and so vary the pressure upon said resistance as to weaken the generator field, and normally to maintain said current substantially constant, said resistance being normally free from other effective electrical influence, a voltage coil coacting with said actuating means and adapted upon being energized to add its effect to said current coil in varying the pressure upon said resistance to weaken the generator field, and voltage controlled means adapted to direct an effective flow of current through said voltage coil.

11. In car lighting apparatus, in combination, a generator having a shunt field winding, a storage battery connected to be charged thereby, a resistance medium operatively connected with the field circuit of said generator, means comprising a coil serially connected between said generator and said battery adapted upon the current therein tending to increase, to so affect said resistance as to weaken the field of said generator and normally to maintain said current substantially constant, said resistance being normally free from other effective electrical influence, a normally ineffective voltage coil adapted upon becoming effective to control said generator current by acting on the resistance of the generator field circuit, and means adapted upon the voltage of said battery attaining a certain value to render said voltage coil effective in controlling said generator current.

12. In an electrical system, the combination of a generator, a storage battery and work circuit in operative relation thereto, regulating means for the work circuit and means for regulating the generator affected by the actuation of the work circuit regulating means.

JOHN W. JEPSON.

Witnesses:
 H. C. WORKMAN,
 WILLIAM P. HAMMOND.

It is hereby certified that Letters Patent No. 1,296,292, granted March 4, 1919, upon the application of John W. Jepson, of New York, N. Y., for an improvement in "Systems of Electrical Distribution," were erroneously issued to the inventor, said Jepson, whereas said Letters Patent should have been issued to *Gould Coupler Company, a corporation of New York*, said corporation being assignee of the entire interest in said invention, as shown by the record of assignments in this office; and that the said Letters Patent should be read with this correction therein that the same may conform to the record of the case in the Patent Office.

Signed and sealed this 8th day of April, A. D., 1919.

[SEAL.]

F. W. H. CLAY,
*Acting Commissioner of Patents.*

Cl. 171—313